(12) United States Patent
Dierksen et al.

(10) Patent No.: US 12,548,667 B2
(45) Date of Patent: Feb. 10, 2026

(54) SYSTEM AND METHOD FOR CHECKING COMPATIBILITY OF HARDWARE AND SOFTWARE COMPONENTS IN A SURGICAL ROBOT

(71) Applicant: Covidien LP, Mansfield, MA (US)

(72) Inventors: Gregory A. Dierksen, Brookline, MA (US); Paul M. Loschak, Somerville, MA (US); Edward Bryn Pitt, Southington, CT (US)

(73) Assignee: Covidien LP, Mansfield, MA (US)

( * ) Notice: Subject to any disclaimer, the term of this patent is extended or adjusted under 35 U.S.C. 154(b) by 480 days.

(21) Appl. No.: 18/097,652

(22) Filed: Jan. 17, 2023

(65) Prior Publication Data

US 2023/0260640 A1 Aug. 17, 2023

(51) Int. Cl.
*G16H 40/40* (2018.01)
*A61B 34/37* (2016.01)
*G16H 40/63* (2018.01)

(52) U.S. Cl.
CPC ............. *G16H 40/40* (2018.01); *A61B 34/37* (2016.02); *G16H 40/63* (2018.01)

(58) Field of Classification Search
CPC ........ G16H 40/40; G16H 40/63; A61B 34/37; A61B 34/25; A61B 34/70; A61B 90/361; A61B 90/90; A61B 2034/301; A61B 34/30
USPC .......................................................... 600/1
See application file for complete search history.

(56) References Cited

U.S. PATENT DOCUMENTS

| | | | |
|---|---|---|---|
| 6,132,368 A | 10/2000 | Cooper | |
| 6,206,903 B1 | 3/2001 | Ramans | |
| 6,246,200 B1 | 6/2001 | Blumenkranz et al. | |
| 6,312,435 B1 | 11/2001 | Wallace et al. | |
| 6,331,181 B1 | 12/2001 | Tierney et al. | |
| 6,394,998 B1 | 5/2002 | Wallace et al. | |
| 6,424,885 B1 | 7/2002 | Niemeyer et al. | |
| 6,441,577 B2 | 8/2002 | Blumenkranz et al. | |
| 6,459,926 B1 | 10/2002 | Nowlin et al. | |
| 6,491,691 B1 | 12/2002 | Morley et al. | |
| 6,491,701 B2 | 12/2002 | Tierney et al. | |
| 6,493,608 B1 | 12/2002 | Niemeyer | |
| 6,565,554 B1 | 5/2003 | Niemeyer | |
| 6,645,196 B1 * | 11/2003 | Nixon | A61B 34/37 606/1 |
| 6,659,939 B2 | 12/2003 | Moll | |
| 6,671,581 B2 | 12/2003 | Niemeyer et al. | |

(Continued)

OTHER PUBLICATIONS

Extended European Search Report issued in corresponding application EP 23156241.4 dated Jul. 11, 2023 (8 pages).

*Primary Examiner* — Carl H Layno
*Assistant Examiner* — Mary Grace Schlueter
(74) *Attorney, Agent, or Firm* — Carter, DeLuca & Farrel

(57) ABSTRACT

A surgical robotic system includes a surgical instrument having an instrument memory storing a list having a plurality of identifiers, each of which identifies a compatible software module. The system also includes a main memory having a plurality of stored software modules, each of which includes instructions for controlling a particular type of surgical instruments. The system further includes a controller configured to communicate with the instrument memory and to determine whether at least one of the stored software modules matches at least one of the compatible software modules.

20 Claims, 10 Drawing Sheets

(56) References Cited

U.S. PATENT DOCUMENTS

| | | |
|---|---|---|
| 6,676,684 B1 | 1/2004 | Morley et al. |
| 6,685,698 B2 | 2/2004 | Morley et al. |
| 6,699,235 B2 | 3/2004 | Wallace et al. |
| 6,714,839 B2 | 3/2004 | Salisbury, Jr. et al. |
| 6,716,233 B1 | 4/2004 | Whitman |
| 6,728,599 B2 | 4/2004 | Wang et al. |
| 6,746,443 B1 | 6/2004 | Morley et al. |
| 6,766,204 B2 | 7/2004 | Niemeyer et al. |
| 6,770,081 B1 | 8/2004 | Cooper et al. |
| 6,772,053 B2 | 8/2004 | Niemeyer |
| 6,783,524 B2 | 8/2004 | Anderson et al. |
| 6,793,652 B1 | 9/2004 | Whitman et al. |
| 6,793,653 B2 | 9/2004 | Sanchez et al. |
| 6,799,065 B1 | 9/2004 | Niemeyer |
| 6,837,883 B2 | 1/2005 | Moll et al. |
| 6,839,612 B2 | 1/2005 | Sanchez et al. |
| 6,840,938 B1 | 1/2005 | Morley et al. |
| 6,843,403 B2 | 1/2005 | Whitman |
| 6,846,309 B2 | 1/2005 | Whitman et al. |
| 6,866,671 B2 | 3/2005 | Tierney et al. |
| 6,871,117 B2 | 3/2005 | Wang et al. |
| 6,879,880 B2 | 4/2005 | Nowlin et al. |
| 6,899,705 B2 | 5/2005 | Niemeyer |
| 6,902,560 B1 | 6/2005 | Morley et al. |
| 6,936,042 B2 | 8/2005 | Wallace et al. |
| 6,951,535 B2 | 10/2005 | Ghodoussi et al. |
| 6,974,449 B2 | 12/2005 | Niemeyer |
| 6,991,627 B2 | 1/2006 | Madhani et al. |
| 6,994,708 B2 | 2/2006 | Manzo |
| 7,048,745 B2 | 5/2006 | Tierney et al. |
| 7,066,926 B2 | 6/2006 | Wallace et al. |
| 7,118,582 B1 | 10/2006 | Wang et al. |
| 7,125,403 B2 | 10/2006 | Julian et al. |
| 7,155,315 B2 | 12/2006 | Niemeyer et al. |
| 7,239,940 B2 | 7/2007 | Wang et al. |
| 7,306,597 B2 | 12/2007 | Manzo |
| 7,357,774 B2 | 4/2008 | Cooper |
| 7,373,219 B2 | 5/2008 | Nowlin et al. |
| 7,379,790 B2 | 5/2008 | Toth et al. |
| 7,386,365 B2 | 6/2008 | Nixon |
| 7,391,173 B2 | 6/2008 | Schena |
| 7,398,707 B2 | 7/2008 | Morley et al. |
| 7,413,565 B2 | 8/2008 | Wang et al. |
| 7,453,227 B2 | 11/2008 | Prisco et al. |
| 7,524,320 B2 | 4/2009 | Tierney et al. |
| 7,574,250 B2 | 8/2009 | Niemeyer |
| 7,594,912 B2 | 9/2009 | Cooper et al. |
| 7,607,440 B2 | 10/2009 | Coste-Maniere et al. |
| 7,666,191 B2 | 2/2010 | Orban, III et al. |
| 7,682,357 B2 | 3/2010 | Ghodoussi et al. |
| 7,689,320 B2 | 3/2010 | Prisco et al. |
| 7,695,481 B2 | 4/2010 | Wang et al. |
| 7,695,485 B2 | 4/2010 | Whitman et al. |
| 7,699,855 B2 | 4/2010 | Anderson et al. |
| 7,713,263 B2 | 5/2010 | Niemeyer |
| 7,725,214 B2 | 5/2010 | Diolaiti |
| 7,727,244 B2 | 6/2010 | Orban, III et al. |
| 7,741,802 B2 | 6/2010 | Prisco |
| 7,756,036 B2 | 7/2010 | Druke et al. |
| 7,757,028 B2 | 7/2010 | Druke et al. |
| 7,762,825 B2 | 7/2010 | Burbank et al. |
| 7,778,733 B2 | 8/2010 | Nowlin et al. |
| 7,803,151 B2 | 9/2010 | Whitman |
| 7,806,891 B2 | 10/2010 | Nowlin et al. |
| 7,819,859 B2 | 10/2010 | Prisco et al. |
| 7,819,885 B2 | 10/2010 | Cooper |
| 7,824,401 B2 | 11/2010 | Manzo et al. |
| 7,835,823 B2 | 11/2010 | Sillman et al. |
| 7,843,158 B2 | 11/2010 | Prisco |
| 7,865,266 B2 | 1/2011 | Moll et al. |
| 7,865,269 B2 | 1/2011 | Prisco et al. |
| 7,886,743 B2 | 2/2011 | Cooper et al. |
| 7,899,578 B2 | 3/2011 | Prisco et al. |
| 7,907,166 B2 | 3/2011 | Lamprecht et al. |
| 7,935,130 B2 | 5/2011 | Williams |
| 7,963,913 B2 | 6/2011 | Devengenzo et al. |
| 7,983,793 B2 | 7/2011 | Toth et al. |
| 8,002,767 B2 | 8/2011 | Sanchez |
| 8,004,229 B2 | 8/2011 | Nowlin et al. |
| 8,012,170 B2 | 9/2011 | Whitman et al. |
| 8,054,752 B2 | 11/2011 | Druke et al. |
| 8,062,288 B2 | 11/2011 | Cooper et al. |
| 8,079,950 B2 | 12/2011 | Stern et al. |
| 8,100,133 B2 | 1/2012 | Mintz et al. |
| 8,108,072 B2 | 1/2012 | Zhao et al. |
| 8,120,301 B2 | 2/2012 | Goldberg et al. |
| 8,142,447 B2 | 3/2012 | Cooper et al. |
| 8,147,503 B2 | 4/2012 | Zhao et al. |
| 8,151,661 B2 | 4/2012 | Schena et al. |
| 8,155,479 B2 | 4/2012 | Hoffman et al. |
| 8,182,469 B2 | 5/2012 | Anderson et al. |
| 8,202,278 B2 | 6/2012 | Orban, III et al. |
| 8,206,406 B2 | 6/2012 | Orban, III |
| 8,210,413 B2 | 7/2012 | Whitman et al. |
| 8,216,250 B2 | 7/2012 | Orban, III et al. |
| 8,220,468 B2 | 7/2012 | Cooper et al. |
| 8,256,319 B2 | 9/2012 | Cooper et al. |
| 8,285,517 B2 | 10/2012 | Sillman et al. |
| 8,315,720 B2 | 11/2012 | Mohr et al. |
| 8,335,590 B2 | 12/2012 | Costa et al. |
| 8,347,757 B2 | 1/2013 | Duval |
| 8,374,723 B2 | 2/2013 | Zhao et al. |
| 8,418,073 B2 | 4/2013 | Mohr et al. |
| 8,419,717 B2 | 4/2013 | Diolaiti et al. |
| 8,423,182 B2 | 4/2013 | Robinson et al. |
| 8,452,447 B2 | 5/2013 | Nixon |
| 8,454,585 B2 | 6/2013 | Whitman |
| 8,499,992 B2 | 8/2013 | Whitman et al. |
| 8,508,173 B2 | 8/2013 | Goldberg et al. |
| 8,528,440 B2 | 9/2013 | Morley et al. |
| 8,529,582 B2 | 9/2013 | Devengenzo et al. |
| 8,540,748 B2 | 9/2013 | Murphy et al. |
| 8,551,116 B2 | 10/2013 | Julian et al. |
| 8,562,594 B2 | 10/2013 | Cooper et al. |
| 8,594,841 B2 | 11/2013 | Zhao et al. |
| 8,597,182 B2 | 12/2013 | Stein et al. |
| 8,597,280 B2 | 12/2013 | Cooper et al. |
| 8,600,551 B2 | 12/2013 | Itkowitz et al. |
| 8,602,288 B2 * | 12/2013 | Shelton, IV ............ A61B 34/76 227/176.1 |
| 8,608,773 B2 | 12/2013 | Tierney et al. |
| 8,620,473 B2 | 12/2013 | Diolaiti et al. |
| 8,624,537 B2 | 1/2014 | Nowlin et al. |
| 8,634,957 B2 | 1/2014 | Toth et al. |
| 8,638,056 B2 | 1/2014 | Goldberg et al. |
| 8,638,057 B2 | 1/2014 | Goldberg et al. |
| 8,644,988 B2 | 2/2014 | Prisco et al. |
| 8,666,544 B2 | 3/2014 | Moll et al. |
| 8,668,638 B2 | 3/2014 | Donhowe et al. |
| 8,746,252 B2 | 6/2014 | McGrogan et al. |
| 8,749,189 B2 | 6/2014 | Nowlin et al. |
| 8,749,190 B2 | 6/2014 | Nowlin et al. |
| 8,758,352 B2 | 6/2014 | Cooper et al. |
| 8,761,930 B2 | 6/2014 | Nixon |
| 8,768,516 B2 | 7/2014 | Diolaiti et al. |
| 8,786,241 B2 | 7/2014 | Nowlin et al. |
| 8,790,243 B2 | 7/2014 | Cooper et al. |
| 8,808,164 B2 | 8/2014 | Hoffman et al. |
| 8,816,628 B2 | 8/2014 | Nowlin et al. |
| 8,821,480 B2 | 9/2014 | Burbank |
| 8,823,308 B2 | 9/2014 | Nowlin et al. |
| 8,827,989 B2 | 9/2014 | Niemeyer |
| 8,838,270 B2 | 9/2014 | Druke et al. |
| 8,852,174 B2 | 10/2014 | Burbank |
| 8,858,547 B2 | 10/2014 | Brogna |
| 8,862,268 B2 | 10/2014 | Robinson et al. |
| 8,864,751 B2 | 10/2014 | Prisco et al. |
| 8,864,752 B2 | 10/2014 | Diolaiti et al. |
| 8,903,546 B2 | 12/2014 | Diolaiti et al. |
| 8,903,549 B2 | 12/2014 | Itkowitz et al. |
| 8,911,428 B2 | 12/2014 | Cooper et al. |
| 8,912,746 B2 | 12/2014 | Reid et al. |
| 8,944,070 B2 | 2/2015 | Guthart |
| 8,989,903 B2 | 3/2015 | Weir et al. |

(56) References Cited

U.S. PATENT DOCUMENTS

| | | |
|---|---|---|
| 9,002,518 B2 | 4/2015 | Manzo |
| 9,014,856 B2 | 4/2015 | Manzo et al. |
| 9,016,540 B2 | 4/2015 | Whitman et al. |
| 9,019,345 B2 | 4/2015 | O'Grady et al. |
| 9,043,027 B2 | 5/2015 | Durant et al. |
| 9,050,120 B2 | 6/2015 | Swarup et al. |
| 9,055,961 B2 | 6/2015 | Manzo et al. |
| 9,068,628 B2 | 6/2015 | Solomon et al. |
| 9,078,684 B2 | 7/2015 | Williams |
| 9,084,623 B2 | 7/2015 | Gomez et al. |
| 9,095,362 B2 | 8/2015 | Dachs, II et al. |
| 9,096,033 B2 | 8/2015 | Holop et al. |
| 9,101,381 B2 | 8/2015 | Burbank et al. |
| 9,113,877 B1 | 8/2015 | Whitman et al. |
| 9,138,284 B2 | 9/2015 | Krom et al. |
| 9,144,456 B2 | 9/2015 | Rosa et al. |
| 9,198,730 B2 | 12/2015 | Prisco et al. |
| 9,204,923 B2 | 12/2015 | Manzo et al. |
| 9,226,648 B2 | 1/2016 | Saadat et al. |
| 9,226,750 B2 | 1/2016 | Weir et al. |
| 9,226,761 B2 | 1/2016 | Burbank |
| 9,232,984 B2 | 1/2016 | Guthart et al. |
| 9,241,766 B2 | 1/2016 | Duque et al. |
| 9,241,767 B2 | 1/2016 | Prisco et al. |
| 9,241,769 B2 | 1/2016 | Larkin et al. |
| 9,259,275 B2 | 2/2016 | Burbank |
| 9,259,277 B2 | 2/2016 | Rogers et al. |
| 9,259,281 B2 | 2/2016 | Griffiths et al. |
| 9,259,282 B2 | 2/2016 | Azizian et al. |
| 9,261,172 B2 | 2/2016 | Solomon et al. |
| 9,265,567 B2 | 2/2016 | Orban, III et al. |
| 9,265,584 B2 | 2/2016 | Itkowitz et al. |
| 9,283,049 B2 | 3/2016 | Diolaiti et al. |
| 9,301,811 B2 | 4/2016 | Goldberg et al. |
| 9,314,307 B2 | 4/2016 | Richmond et al. |
| 9,317,651 B2 | 4/2016 | Nixon |
| 9,345,546 B2 | 5/2016 | Toth et al. |
| 9,393,017 B2 | 7/2016 | Flanagan et al. |
| 9,402,689 B2 | 8/2016 | Prisco et al. |
| 9,417,621 B2 | 8/2016 | Diolaiti |
| 9,424,303 B2 | 8/2016 | Hoffman et al. |
| 9,433,418 B2 | 9/2016 | Whitman et al. |
| 9,446,517 B2 | 9/2016 | Burns et al. |
| 9,452,020 B2 | 9/2016 | Griffiths et al. |
| 9,474,569 B2 | 10/2016 | Manzo et al. |
| 9,480,533 B2 | 11/2016 | Devengenzo et al. |
| 9,503,713 B2 | 11/2016 | Zhao et al. |
| 9,550,300 B2 | 1/2017 | Danitz et al. |
| 9,554,859 B2 | 1/2017 | Nowlin et al. |
| 9,566,124 B2 | 2/2017 | Prisco et al. |
| 9,579,164 B2 | 2/2017 | Itkowitz et al. |
| 9,585,641 B2 | 3/2017 | Cooper et al. |
| 9,615,883 B2 | 4/2017 | Schena et al. |
| 9,623,563 B2 | 4/2017 | Nixon |
| 9,623,902 B2 | 4/2017 | Griffiths et al. |
| 9,629,520 B2 | 4/2017 | Diolaiti |
| 9,662,177 B2 | 5/2017 | Weir et al. |
| 9,664,262 B2 | 5/2017 | Donlon et al. |
| 9,675,354 B2 | 6/2017 | Weir et al. |
| 9,687,312 B2 | 6/2017 | Dachs, II et al. |
| 9,700,334 B2 | 7/2017 | Hinman et al. |
| 9,718,190 B2 | 8/2017 | Larkin et al. |
| 9,730,719 B2 | 8/2017 | Brisson et al. |
| 9,737,199 B2 | 8/2017 | Pistor et al. |
| 9,795,446 B2 | 10/2017 | DiMaio et al. |
| 9,797,484 B2 | 10/2017 | Solomon et al. |
| 9,801,690 B2 | 10/2017 | Larkin et al. |
| 9,814,530 B2 | 11/2017 | Weir et al. |
| 9,814,536 B2 | 11/2017 | Goldberg et al. |
| 9,814,537 B2 | 11/2017 | Itkowitz et al. |
| 9,820,823 B2 | 11/2017 | Richmond et al. |
| 9,827,059 B2 | 11/2017 | Robinson et al. |
| 9,830,371 B2 | 11/2017 | Hoffman et al. |
| 9,839,481 B2 | 12/2017 | Blumenkranz et al. |
| 9,839,487 B2 | 12/2017 | Dachs, II |
| 9,850,994 B2 | 12/2017 | Schena |
| 9,855,102 B2 | 1/2018 | Blumenkranz |
| 9,855,107 B2 | 1/2018 | Labonville et al. |
| 9,872,737 B2 | 1/2018 | Nixon |
| 9,877,718 B2 | 1/2018 | Weir et al. |
| 9,883,920 B2 | 2/2018 | Blumenkranz |
| 9,888,974 B2 | 2/2018 | Niemeyer |
| 9,895,813 B2 | 2/2018 | Blumenkranz et al. |
| 9,901,408 B2 | 2/2018 | Larkin |
| 9,918,800 B2 | 3/2018 | Itkowitz et al. |
| 9,943,375 B2 | 4/2018 | Blumenkranz et al. |
| 9,948,852 B2 | 4/2018 | Lilagan et al. |
| 9,949,798 B2 | 4/2018 | Weir |
| 9,949,802 B2 | 4/2018 | Cooper |
| 9,952,107 B2 | 4/2018 | Blumenkranz et al. |
| 9,956,044 B2 | 5/2018 | Gomez et al. |
| 9,980,778 B2 | 5/2018 | Ohline et al. |
| 10,008,017 B2 | 6/2018 | Itkowitz et al. |
| 10,028,793 B2 | 7/2018 | Griffiths et al. |
| 10,033,308 B2 | 7/2018 | Chaghajerdi et al. |
| 10,034,719 B2 | 7/2018 | Richmond et al. |
| 10,052,167 B2 | 8/2018 | Au et al. |
| 10,085,811 B2 | 10/2018 | Weir et al. |
| 10,092,165 B2 | 10/2018 | Power |
| 10,092,344 B2 | 10/2018 | Mohr et al. |
| 10,123,844 B2 | 11/2018 | Nowlin |
| 10,188,471 B2 | 1/2019 | Brisson |
| 10,201,390 B2 | 2/2019 | Swarup et al. |
| 10,213,202 B2 | 2/2019 | Flanagan et al. |
| 10,258,416 B2 | 4/2019 | Mintz et al. |
| 10,278,782 B2 | 5/2019 | Jarc et al. |
| 10,278,783 B2 | 5/2019 | Itkowitz et al. |
| 10,282,881 B2 | 5/2019 | Itkowitz et al. |
| 10,335,242 B2 | 7/2019 | Devengenzo et al. |
| 10,405,934 B2 | 9/2019 | Prisco et al. |
| 10,433,922 B2 | 10/2019 | Itkowitz et al. |
| 10,464,219 B2 | 11/2019 | Robinson et al. |
| 10,485,621 B2 | 11/2019 | Morrissette et al. |
| 10,500,004 B2 | 12/2019 | Hanuschik et al. |
| 10,500,005 B2 | 12/2019 | Weir et al. |
| 10,500,007 B2 | 12/2019 | Richmond et al. |
| 10,507,066 B2 | 12/2019 | DiMaio et al. |
| 10,510,267 B2 | 12/2019 | Jarc et al. |
| 10,524,871 B2 | 1/2020 | Liao |
| 10,548,459 B2 | 2/2020 | Itkowitz et al. |
| 10,575,909 B2 | 3/2020 | Robinson et al. |
| 10,592,529 B2 | 3/2020 | Hoffman et al. |
| 10,595,946 B2 | 3/2020 | Nixon |
| 10,881,469 B2 | 1/2021 | Robinson |
| 10,881,473 B2 | 1/2021 | Itkowitz et al. |
| 10,898,188 B2 | 1/2021 | Burbank |
| 10,898,189 B2 | 1/2021 | McDonald, II |
| 10,905,506 B2 | 2/2021 | Itkowitz et al. |
| 10,912,544 B2 | 2/2021 | Brisson et al. |
| 10,912,619 B2 | 2/2021 | Jarc et al. |
| 10,918,387 B2 | 2/2021 | Duque et al. |
| 10,918,449 B2 | 2/2021 | Solomon et al. |
| 10,932,873 B2 | 3/2021 | Griffiths et al. |
| 10,932,877 B2 | 3/2021 | Devengenzo et al. |
| 10,939,969 B2 | 3/2021 | Swarup et al. |
| 10,939,973 B2 | 3/2021 | DiMaio et al. |
| 10,952,801 B2 | 3/2021 | Miller et al. |
| 10,965,933 B2 | 3/2021 | Jarc |
| 10,966,742 B2 | 4/2021 | Rosa et al. |
| 10,973,517 B2 | 4/2021 | Wixey |
| 10,973,519 B2 | 4/2021 | Weir et al. |
| 10,984,567 B2 | 4/2021 | Itkowitz et al. |
| 10,993,773 B2 | 5/2021 | Cooper et al. |
| 10,993,775 B2 | 5/2021 | Cooper et al. |
| 11,000,331 B2 | 5/2021 | Krom et al. |
| 11,013,567 B2 | 5/2021 | Wu et al. |
| 11,020,138 B2 | 6/2021 | Ragosta |
| 11,020,191 B2 | 6/2021 | Diolaiti et al. |
| 11,020,193 B2 | 6/2021 | Wixey et al. |
| 11,026,755 B2 | 6/2021 | Weir et al. |
| 11,026,759 B2 | 6/2021 | Donlon et al. |
| 11,040,189 B2 | 6/2021 | Vaders et al. |
| 11,045,077 B2 | 6/2021 | Stern et al. |
| 11,045,274 B2 | 6/2021 | Dachs, II et al. |

(56) References Cited

U.S. PATENT DOCUMENTS

| | | | |
|---|---|---|---|
| 11,058,501 B2 | 7/2021 | Tokarchuk et al. | |
| 11,076,925 B2 | 8/2021 | DiMaio et al. | |
| 11,090,119 B2 | 8/2021 | Burbank | |
| 11,096,687 B2 | 8/2021 | Flanagan et al. | |
| 11,098,803 B2 | 8/2021 | Duque et al. | |
| 11,109,925 B2 | 9/2021 | Cooper et al. | |
| 11,116,578 B2 | 9/2021 | Hoffman et al. | |
| 11,129,683 B2 | 9/2021 | Steger et al. | |
| 11,135,029 B2 | 10/2021 | Suresh et al. | |
| 11,147,552 B2 | 10/2021 | Burbank et al. | |
| 11,147,640 B2 | 10/2021 | Jarc et al. | |
| 11,154,373 B2 | 10/2021 | Abbott et al. | |
| 11,154,374 B2 | 10/2021 | Hanuschik et al. | |
| 11,160,622 B2 | 11/2021 | Goldberg et al. | |
| 11,160,625 B2 | 11/2021 | Wixey et al. | |
| 11,161,243 B2 | 11/2021 | Rabindran et al. | |
| 11,166,758 B2 | 11/2021 | Mohr et al. | |
| 11,166,770 B2 | 11/2021 | DiMaio et al. | |
| 11,166,773 B2 | 11/2021 | Ragosta et al. | |
| 11,173,597 B2 | 11/2021 | Rabindran et al. | |
| 11,185,378 B2 | 11/2021 | Weir et al. | |
| 11,191,596 B2 | 12/2021 | Thompson et al. | |
| 11,197,729 B2 | 12/2021 | Thompson et al. | |
| 11,213,360 B2 | 1/2022 | Hourtash et al. | |
| 11,221,863 B2 | 1/2022 | Azizian et al. | |
| 11,234,700 B2 | 2/2022 | Ragosta et al. | |
| 11,241,274 B2 | 2/2022 | Vaders et al. | |
| 11,241,290 B2 | 2/2022 | Waterbury et al. | |
| 11,259,870 B2 | 3/2022 | DiMaio et al. | |
| 11,259,884 B2 | 3/2022 | Burbank | |
| 11,272,993 B2 | 3/2022 | Gomez et al. | |
| 11,272,994 B2 | 3/2022 | Saraliev et al. | |
| 11,291,442 B2 | 4/2022 | Wixey et al. | |
| 11,291,513 B2 | 4/2022 | Manzo et al. | |
| 2004/0073276 A1* | 4/2004 | Samuelsson | A61N 1/37264 607/60 |
| 2005/0251156 A1 | 11/2005 | Toth et al. | |
| 2013/0217967 A1* | 8/2013 | Mohr | A61B 34/37 600/109 |
| 2019/0187658 A1 | 6/2019 | Fischer | |
| 2020/0015820 A1 | 1/2020 | Contini et al. | |

* cited by examiner

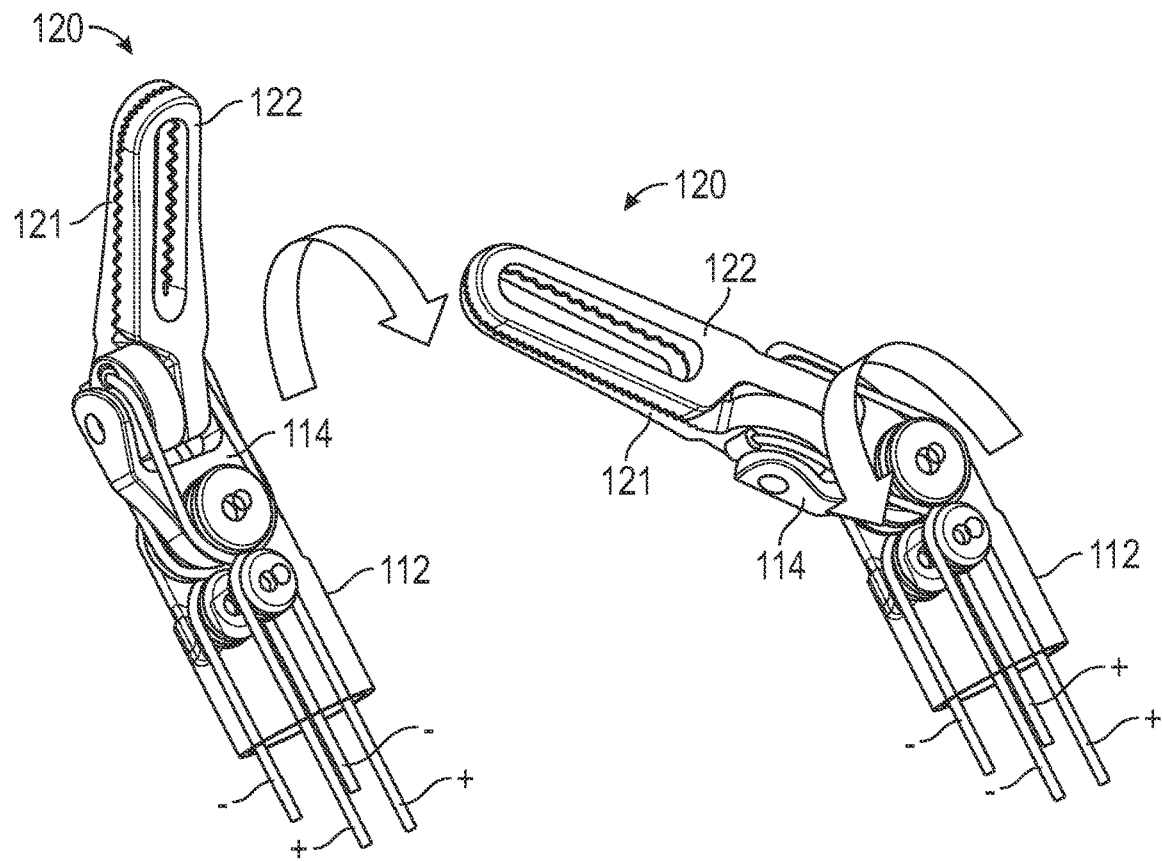
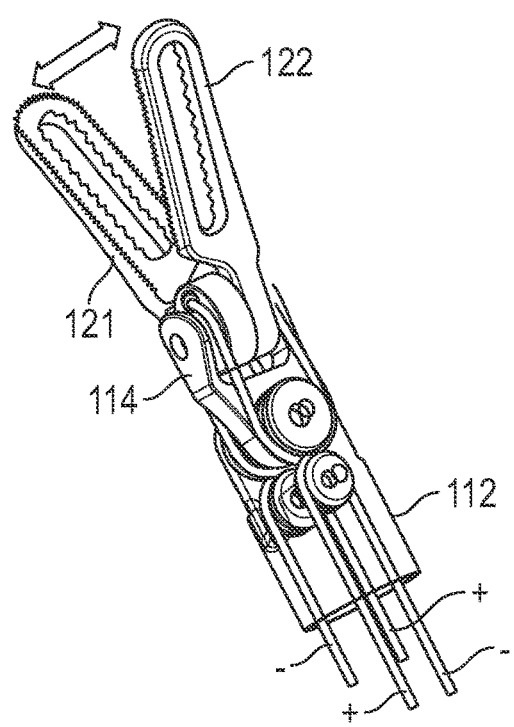
FIG. 7A  FIG. 7B
FIG. 7C

| | binary | decimal | |
|---|---|---|---|
| 1 bit<br>↓<br>00 00 00 00<br>⎵<br>1 byte | 00 00 00 01 | 1 | Software module 200a |
| | 00 00 00 10 | 2 | Software module 200b |
| | 00 00 01 00 | 4 | Software module 200c |

168a....n

| binary | decimal | |
|---|---|---|
| 00 00 00 01 | 1 | Software module 200a |
| 00 00 00 10 | 2 | Software module 200b |
| 00 00 01 00 | 3 | Software module 200c |
| 00 00 10 00 | 4 | Software module 200d |
| 00 01 00 00 | 5 | Software module 200e |
| 00 10 00 00 | 6 | Software module 200f |
| 01 00 00 00 | 7 | Software module 200g |
| 10 00 00 00 | 8 | Software module 200h |

```
                00 00 00 01 | 00 00 00 10    Instrument storing 2 is compatible only
                       1              2      with software module 200b 00 00 00 10 | 00 00 01 01    Instrument storing 5 is compatible
                       2              5      with software modules 200a ad 200c 00 00 00 01 | 00 00 01 10    Instrument storing 6 is compatible
                       1              6      with software modules 200b ad 200c 00 00 01 00 | 00 00 01 00 | 00 00 00 10 | 00 00 01 11   Instrument storing 7 is compatible
      4             4              2             7     with software modules 200a-c
```

FIG. 9C

SYSTEM AND METHOD FOR CHECKING COMPATIBILITY OF HARDWARE AND SOFTWARE COMPONENTS IN A SURGICAL ROBOT

CROSS-REFERENCE TO RELATED APPLICATIONS

This application claims the benefit of and priority to U.S. Provisional Patent Application No. 63/310,221 filed Feb. 15, 2022. The entire disclosure of the foregoing application is incorporated by referenced herein.

BACKGROUND

Surgical robotic systems may include a surgeon console controlling one or more surgical robotic arms, each having a surgical instrument having an end effector (e.g., forceps or grasping instrument). In operation, the robotic arm is moved to a position over a patient and the surgical instrument is guided into a small incision via a surgical access port or a natural orifice of a patient to position the end effector at a work site within the patient's body.

Surgical robotic systems may operate with various types of instruments, such as vessel sealers, graspers, dissectors, etc. Each type of instrument may have different hardware iterations, which may affect kinematics of the instrument, thus requiring different software modules (i.e., controllers), operating the instruments. This creates a challenge for tracking compatibility between instruments and controller versions. Thus, it would be advantageous if a robotic system could determine what controllers are compatible with which versions of instrument hardware.

For example, in surgical shears, reducing the width of a shears blade base results in a decrease in a drive cable tension for closing the shears, which in turn, increases the time to failure for the instrument. However, in order to realize the increased time to failure, the controller needs to be modified to use lower torque targets. Furthermore, while the version of shears with a modified, e.g., narrower, blade base can be operated by either controller, the shears with a wide blade base are incompatible with the lower torque target controller, since higher friction to close the shears may result in improper closure of the blades.

SUMMARY

According to one embodiment of the present disclosure, a surgical robotic system is disclosed. The surgical robotic system includes a surgical instrument having an instrument memory storing a list having at least one identifier identifying a compatible software module. The system also includes a main memory having at least one stored software module having instructions for controlling the surgical instrument. The system further includes a controller configured to communicate with the instrument memory and to determine whether the at least one stored software module matches the compatible software module.

Implementations of the above embodiment may include one or more of the following features. According to one aspect of the above embodiment, the surgical robotic system may also include a robotic arm having an instrument drive unit. The surgical instrument may be configured to couple to the instrument drive unit having at least one motor. The controller is further configured to access the list in response to detecting the surgical instrument being coupled to the instrument drive unit. The surgical instrument may include an end effector having at least one degree of freedom. The at least one stored software module may include software instructions which, when executed by the controller, convert an input movement command into a motor current for the at least one motor to move the end effector in the at least one degree of freedom. The at least one stored software module may include an algorithm having a parameter of the surgical instrument.

According to another embodiment of the present disclosure, a surgical robotic system is disclosed. The surgical robotic system includes a surgical instrument having an instrument memory storing a list having a plurality of identifiers, each of which identifies a compatible software module. The system also includes a main memory having a plurality of stored software modules, each of which includes instructions for controlling a particular type of surgical instrument. The system further includes a controller configured to communicate with the instrument memory and to determine whether at least one of the stored software modules matches at least one of the compatible software modules.

Implementations of the above embodiment may include one or more of the following features. According to one aspect of the above embodiment, the surgical robotic system may also include a robotic arm having an instrument drive unit. The surgical instrument may be configured to couple to the instrument drive unit having at least one motor. The controller is further configured to access the list in response to detecting the surgical instrument being coupled to the instrument drive unit. The surgical instrument may include an end effector having at least one degree of freedom. A matching software module may include software instructions which, when executed by the controller, convert an input movement command into a motor current for the at least one motor to move the end effector in the at least one degree of freedom. A matching software module may include an algorithm having a parameter of the surgical instrument.

According to a further embodiment of the present disclosure, a method for checking compatibility in a surgical robotic system is disclosed. The method includes accessing an instrument memory of a surgical instrument and obtaining a list stored in the instrument memory, the list having at least one identifier identifying a compatible software module. The method also includes determining whether at least one software module stored in main memory matches the compatible software module. The software module stored in main memory includes instructions for controlling the surgical instrument. The method further includes selecting one or more software modules stored in main memory based on a match with the compatible software module.

Implementations of the above embodiment may include one or more of the following features. According to one aspect of the above embodiment, the method may include coupling the surgical instrument to an instrument drive unit that includes at least one motor, the instrument drive unit being disposed on a robotic arm and the surgical instrument having an end effector with at least one degree of freedom. The method may further include accessing the list in response to detecting the surgical instrument being coupled to the instrument drive unit. The method may additionally include loading the at least one software module stored in main memory based on the match. The loading may include executing software instructions stored in the at least one software module. The instructions may include converting an input movement command into a motor current for the at least one motor to move the end effector in the at least one degree of freedom. The instructions may also include an algorithm having a parameter of the surgical instrument. The method may additionally include indicating that no compatible software module is present in response to a mismatch between the at least one software module stored in main memory and the compatible software module.

BRIEF DESCRIPTION OF THE DRAWINGS

Various embodiments of the present disclosure are described herein with reference to the drawings wherein:

FIGS. 7A-C are perspective, schematic views of the end effector being moved to adjust yaw, pitch, and jaw angle, respectively, according to the present disclosure;

FIG. 8 is a schematic view of an instrument memory and a main memory according to an embodiment of the present disclosure;

FIGS. 9A-C are exemplary lists stored in the instrument memory according to an embodiment of the present disclosure.

DETAILED DESCRIPTION

Figure 1:
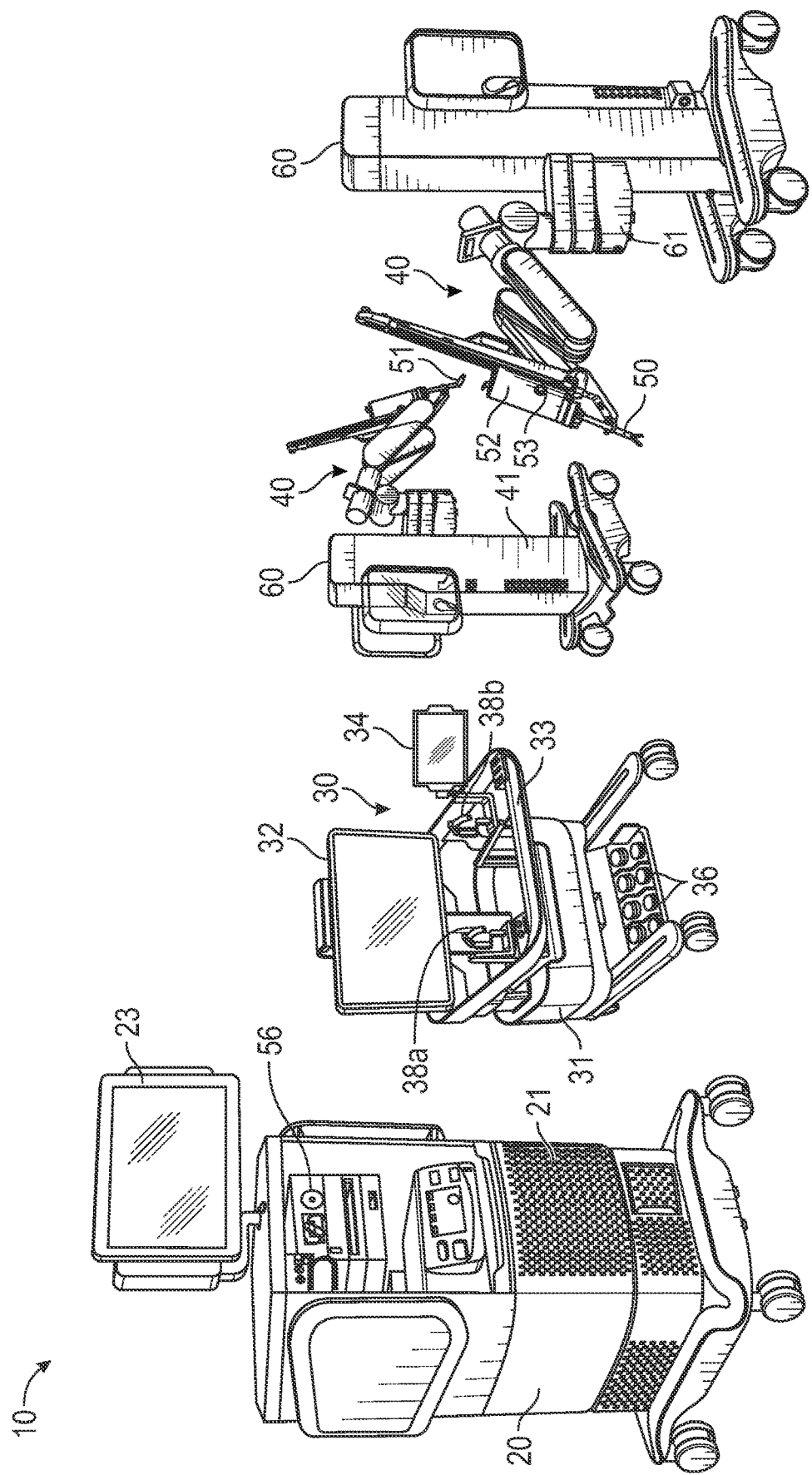
FIG. 1 is a schematic illustration of a surgical robotic system including a control tower, a console, and one or more surgical robotic arms each disposed on a mobile cart according to an embodiment of the present disclosure.

Embodiments of the presently disclosed surgical robotic system are described in detail with reference to the drawings, in which like reference numerals designate identical or corresponding elements in each of the several views. As used herein the term "proximal" refers to the portion of the surgical robotic system and/or the surgical instrument coupled thereto that is closer to a base of a robot, while the term "distal" refers to the portion that is farther from the base of the robot.

As will be described in detail below, the present disclosure is directed to a surgical robotic system, which includes a surgeon console, a control tower, and one or more mobile carts having a surgical robotic arm coupled to a setup arm. The surgeon console receives user input through one or more interface devices, which are interpreted by the control tower as movement commands for moving the surgical robotic arm. The surgical robotic arm includes a controller, which is configured to process the movement command and to generate a torque command for activating one or more actuators of the robotic arm, which would, in turn, move the robotic arm in response to the movement command.

With reference to FIG. 1, a surgical robotic system 10 includes a control tower 20, which is connected to all of the components of the surgical robotic system 10 including a surgeon console 30 and one or more movable carts 60. Each of the movable carts 60 includes a robotic arm 40 having a surgical instrument 50 removably coupled thereto. The robotic arms 40 also couple to the movable cart 60. The robotic system 10 may include any number of movable carts 60 and/or robotic arms 40.

The surgical instrument 50 is configured for use during minimally invasive surgical procedures. In embodiments, the surgical instrument 50 may be configured for open surgical procedures. In embodiments, the surgical instrument 50 may be an endoscope, such as an endoscopic camera 51, configured to provide a video feed for the user. In further embodiments, the surgical instrument 50 may be an electrosurgical forceps configured to seal tissue by compressing tissue between jaw members and applying electrosurgical current thereto. In yet further embodiments, the surgical instrument 50 may be a surgical stapler including a pair of jaws configured to grasp and clamp tissue while deploying a plurality of tissue fasteners, e.g., staples, and cutting stapled tissue.

One of the robotic arms 40 may include the endoscopic camera 51 configured to capture video of the surgical site. The endoscopic camera 51 may be a stereoscopic endoscope configured to capture two side-by-side (i.e., left and right) images of the surgical site to produce a video stream of the surgical scene. The endoscopic camera 51 is coupled to a video processing device 56, which may be disposed within the control tower 20. The video processing device 56 may be any computing device as described below configured to receive the video feed from the endoscopic camera 51 and output the processed video stream.

The surgeon console 30 includes a first display 32, which displays a video feed of the surgical site provided by camera 51 of the surgical instrument 50 disposed on the robotic arm 40, and a second display 34, which displays a user interface for controlling the surgical robotic system 10. The first and second displays 32 and 34 are touchscreens allowing for displaying various graphical user inputs.

The surgeon console 30 also includes a plurality of user interface devices, such as foot pedals 36 and a pair of handle controllers 38a and 38b which are used by a user to remotely control robotic arms 40. The surgeon console further includes an armrest 33 used to support clinician's arms while operating the handle controllers 38a and 38b.

The control tower 20 includes a display 23, which may be a touchscreen, and outputs on the graphical user interfaces (GUIs). The control tower 20 also acts as an interface between the surgeon console 30 and one or more robotic arms 40. In particular, the control tower 20 is configured to control the robotic arms 40, such as to move the robotic arms 40 and the corresponding surgical instrument 50, based on a set of programmable instructions and/or input commands from the surgeon console 30, in such a way that robotic arms 40 and the surgical instrument 50 execute a desired movement sequence in response to input from the foot pedals 36 and the handle controllers 38a and 38b.

Each of the control tower 20, the surgeon console 30, and the robotic arm 40 includes a respective computer 21, 31, 41. The computers 21, 31, 41 are interconnected to each other using any suitable communication network based on wired or wireless communication protocols. The term "network," whether plural or singular, as used herein, denotes a data network, including, but not limited to, the Internet, Intranet, a wide area network, or a local area network, and without limitation as to the full scope of the definition of communication networks as encompassed by the present disclosure. Suitable protocols include, but are not limited to, transmission control protocol/internet protocol (TCP/IP), datagram protocol/internet protocol (UDP/IP), and/or datagram congestion control protocol (DCCP). Wireless communication may be achieved via one or more wireless configurations, e.g., radio frequency, optical, Wi-Fi, Bluetooth (an open wireless protocol for exchanging data over short distances, using short length radio waves, from fixed and mobile devices, creating personal area networks (PANs), ZigBee® (a specification for a suite of high level communication protocols using small, low-power digital radios based on the IEEE 122.15.4-1203 standard for wireless personal area networks (WPANs)).

The computers 21, 31, 41 may include any suitable processor (not shown) operably connected to a memory (not shown), which may include one or more of volatile, non-volatile, magnetic, optical, or electrical media, such as read-only memory (ROM), random access memory (RAM), electrically-erasable programmable ROM (EEPROM), non-volatile RAM (NVRAM), or flash memory. The processor may be any suitable processor (e.g., control circuit) adapted to perform the operations, calculations, and/or set of instructions described in the present disclosure including, but not limited to, a hardware processor, a field programmable gate array (FPGA), a digital signal processor (DSP), a central processing unit (CPU), a microprocessor, and combinations thereof. Those skilled in the art will appreciate that the processor may be substituted for by using any logic processor (e.g., control circuit) adapted to execute algorithms, calculations, and/or set of instructions described herein.

Figure 2:
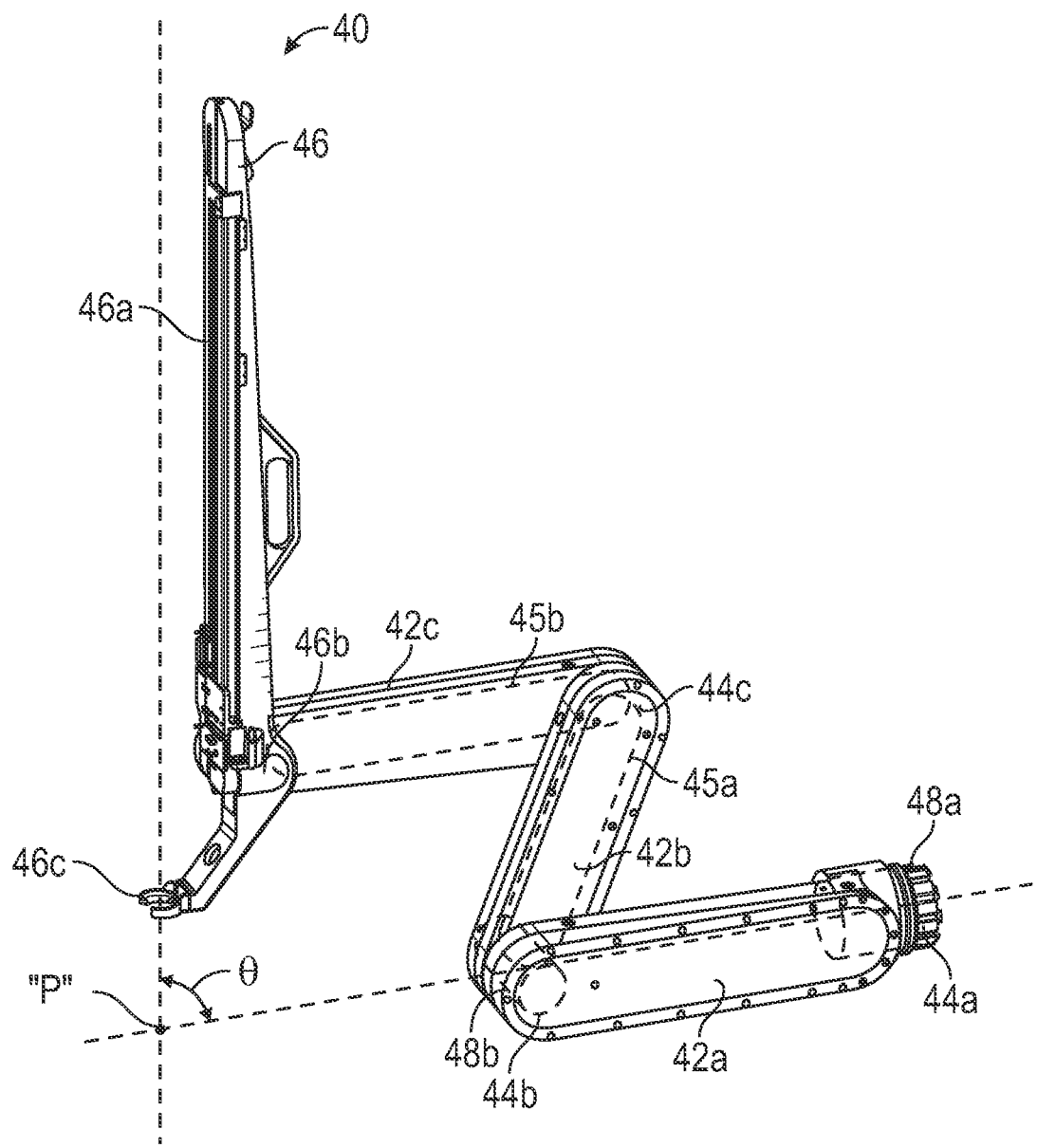
FIG. 2 is a perspective view of a surgical robotic arm of the surgical robotic system of FIG. 1 according to an embodiment of the present disclosure.
Figure 3:
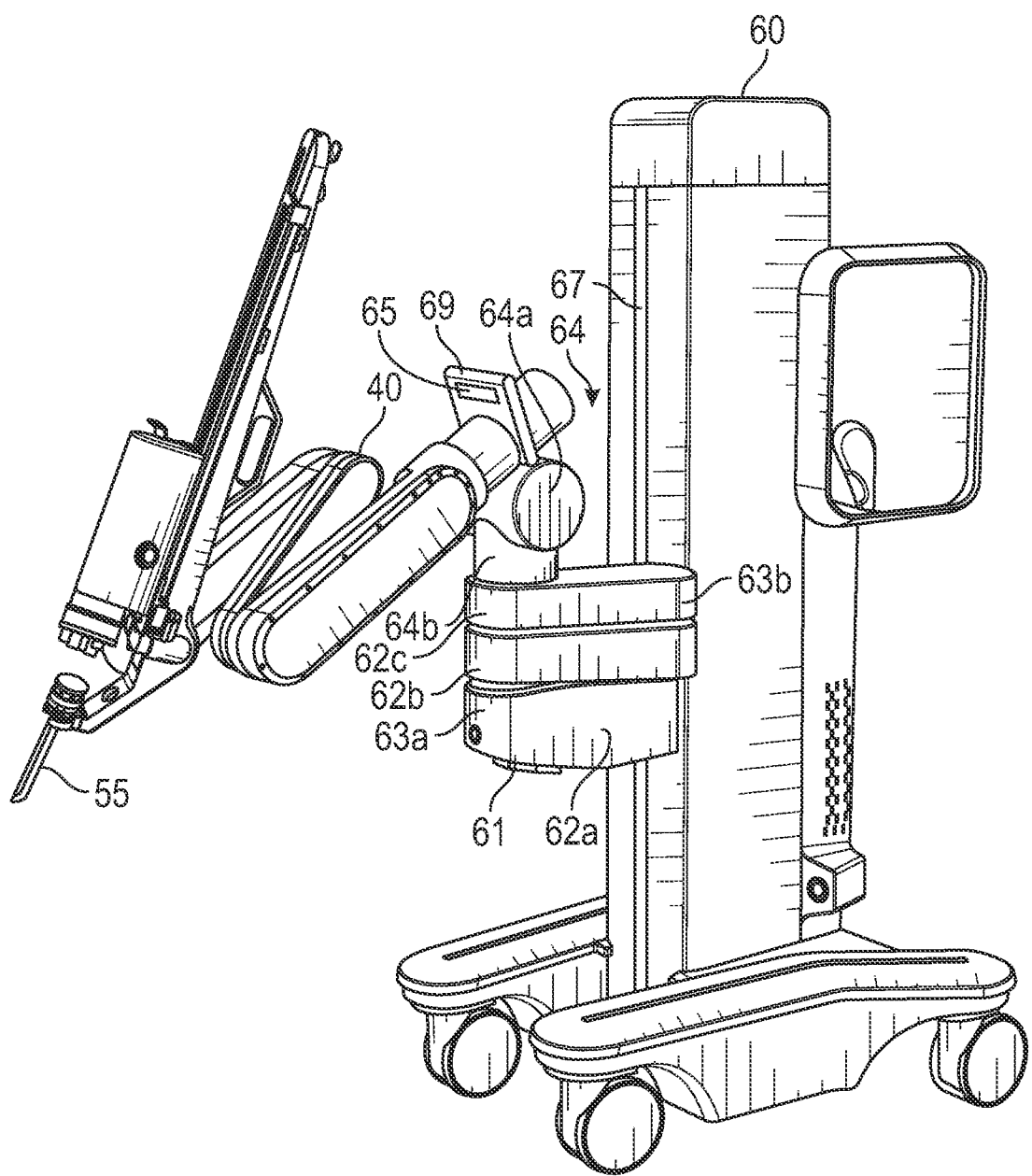
FIG. 3 is a perspective view of a mobile cart having a setup arm with the surgical robotic arm of the surgical robotic system of FIG. 1 according to an embodiment of the present disclosure.

With reference to FIG. 2, each of the robotic arms 40 may include a plurality of links 42a, 42b, 42c, which are interconnected at joints 44a, 44b, 44c, respectively. Other configurations of links and joints may be utilized as known by those skilled in the art. The joint 44a is configured to secure the robotic arm 40 to the mobile cart 60 and defines a first longitudinal axis. With reference to FIG. 3, the mobile cart 60 includes a lift 67 and a setup arm 61, which provides a base for mounting of the robotic arm 40. The lift 67 allows for vertical movement of the setup arm 61. The mobile cart 60 also includes a display 69 for displaying information pertaining to the robotic arm 40. In embodiments, the robotic arm 40 may include any type and/or number of joints.

The setup arm 61 includes a first link 62a, a second link 62b, and a third link 62c, which provide for lateral maneuverability of the robotic arm 40. The links 62a, 62b, 62c are interconnected at joints 63a and 63b, each of which may include an actuator (not shown) for rotating the links 62b and 62b relative to each other and the link 62c. In particular, the links 62a, 62b, 62c are movable in their corresponding lateral planes that are parallel to each other, thereby allowing for extension of the robotic arm 40 relative to the patient (e.g., surgical table). In embodiments, the robotic arm 40 may be coupled to the surgical table (not shown). The setup arm 61 includes controls 65 for adjusting movement of the links 62a, 62b, 62c as well as the lift 67. In embodiments, the setup arm 61 may include any type and/or number of joints.

The third link 62c may include a rotatable base 64 having two degrees of freedom. In particular, the rotatable base 64 includes a first actuator 64a and a second actuator 64b. The first actuator 64a is rotatable about a first stationary arm axis which is perpendicular to a plane defined by the third link 62c and the second actuator 64b is rotatable about a second stationary arm axis which is transverse to the first stationary arm axis. The first and second actuators 64a and 64b allow for full three-dimensional orientation of the robotic arm 40.

The actuator 48b of the joint 44b is coupled to the joint 44c via the belt 45a, and the joint 44c is in turn coupled to the joint 46b via the belt 45b. Joint 44c may include a transfer case coupling the belts 45a and 45b, such that the actuator 48b is configured to rotate each of the links 42b, 42c and a holder 46 relative to each other. More specifically, links 42b, 42c, and the holder 46 are passively coupled to the actuator 48b which enforces rotation about a pivot point "P" which lies at an intersection of the first axis defined by the link 42a and the second axis defined by the holder 46. In other words, the pivot point "P" is a remote center of motion (RCM) for the robotic arm 40. Thus, the actuator 48b controls the angle θ between the first and second axes allowing for orientation of the surgical instrument 50. Due to the interlinking of the links 42a, 42b, 42c, and the holder 46 via the belts 45a and 45b, the angles between the links 42a, 42b, 42c, and the holder 46 are also adjusted in order to achieve the desired angle θ. In embodiments, some or all of the joints 44a, 44b, 44c may include an actuator to obviate the need for mechanical linkages.

The joints 44a and 44b include an actuator 48a and 48b configured to drive the joints 44a, 44b, 44c relative to each other through a series of belts 45a and 45b or other mechanical linkages such as a drive rod, a cable, or a lever and the like. In particular, the actuator 48a is configured to rotate the robotic arm 40 about a longitudinal axis defined by the link 42a.

With reference to FIG. 2, the holder 46 defines a second longitudinal axis and configured to receive an instrument drive unit (IDU) 52 (FIG. 1). The IDU 52 is configured to couple to an actuation mechanism of the surgical instrument 50 and the camera 51 and is configured to move (e.g., rotate) and actuate the instrument 50 and/or the camera 51. IDU 52 transfers actuation forces from its actuators to the surgical instrument 50 to actuate components (e.g., end effector) of the surgical instrument 50. The holder 46 includes a sliding mechanism 46a, which is configured to move the IDU 52 along the second longitudinal axis defined by the holder 46. The holder 46 also includes a joint 46b, which rotates the holder 46 relative to the link 42c. During endoscopic procedures, the instrument 50 may be inserted through an endoscopic access port 55 (FIG. 3) held by the holder 46. The holder 46 also includes a port latch 46c for securing the access port 55 to the holder 46 (FIG. 2).

The robotic arm 40 also includes a plurality of manual override buttons 53 (FIG. 1) disposed on the IDU 52 and the setup arm 61, which may be used in a manual mode. The user may press one or more of the buttons 53 to move the component associated with the button 53.

Figure 4:
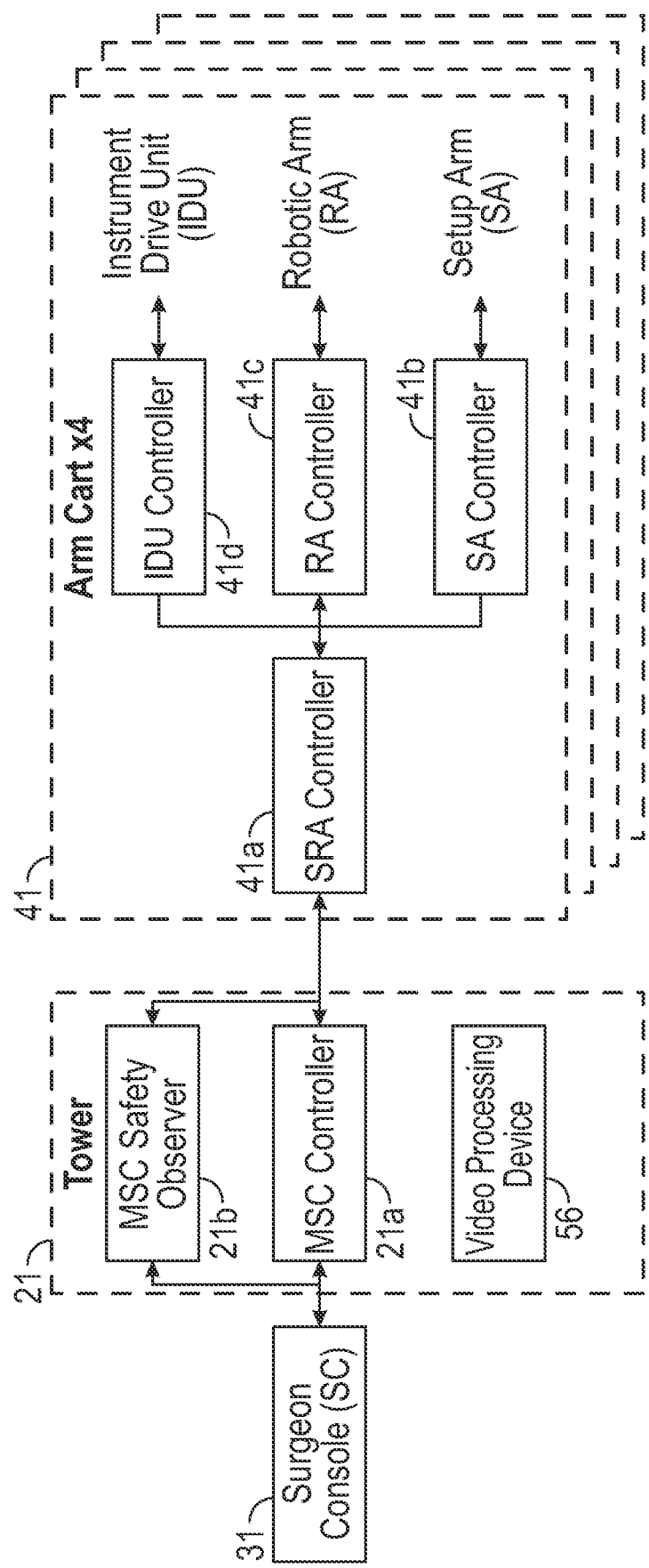
FIG. 4 is a schematic diagram of a computer architecture of the surgical robotic system of FIG. 1 according to an embodiment of the present disclosure.

With reference to FIG. 4, each of the computers 21, 31, 41 of the surgical robotic system 10 may include a plurality of controllers, which may be embodied in hardware and/or software. The computer 21 of the control tower 20 includes a controller 21a and safety observer 21b. The controller 21a receives data from the computer 31 of the surgeon console 30 about the current position and/or orientation of the handle controllers 38a and 38b and the state of the foot pedals 36 and other buttons. The controller 21a processes these input positions to determine desired drive commands for each joint of the robotic arm 40 and/or the IDU 52 and communicates these to the computer 41 of the robotic arm 40. The controller 21a also receives the actual joint angles measured by encoders of the actuators 48a and 48b and uses this information to determine force feedback commands that are transmitted back to the computer 31 of the surgeon console 30 to provide haptic feedback through the handle controllers 38a and 38b. The safety observer 21b performs validity checks on the data going into and out of the controller 21a and notifies a system fault handler if errors in the data transmission are detected to place the computer 21 and/or the surgical robotic system 10 into a safe state.

The computer 41 includes a plurality of controllers, namely, a main cart controller 41a, a setup arm controller 41b, a robotic arm controller 41c, and an instrument drive unit (IDU) controller 41d. The main cart controller 41a receives and processes joint commands from the controller 21a of the computer 21 and communicates them to the setup arm controller 41b, the robotic arm controller 41c, and the IDU controller 41d. The main cart controller 41a also manages instrument exchanges and the overall state of the mobile cart 60, the robotic arm 40, and the IDU 52. The main cart controller 41a also communicates actual joint angles back to the controller 21a.

Each of joints 63a and 63b and the rotatable base 64 of the setup arm 61 are passive joints (i.e., no actuators are present therein) allowing for manual adjustment thereof by a user. The joints 63a and 63b and the rotatable base 64 include brakes that are disengaged by the user to configure the setup arm 61. The setup arm controller 41b monitors slippage of each of joints 63a and 63b and the rotatable base 64 of the setup arm 61, when brakes are engaged or can be freely moved by the operator when brakes are disengaged, but do not impact controls of other joints. The robotic arm controller 41c controls each joint 44a and 44b of the robotic arm 40 and calculates desired motor torques required for gravity compensation, friction compensation, and closed loop position control of the robotic arm 40. The robotic arm controller 41c calculates a movement command based on the calculated torque. The calculated motor commands are then communicated to one or more of the actuators 48a and 48b in the robotic arm 40. The actual joint positions are then transmitted by the actuators 48a and 48b back to the robotic arm controller 41c.

The IDU controller 41d receives desired joint angles for the surgical instrument 50, such as wrist and jaw angles, and computes desired currents for the motors in the IDU 52. The IDU controller 41d calculates actual angles based on the motor positions and transmits the actual angles back to the main cart controller 41a.

The robotic arm 40 is controlled in response to a pose of the handle controller controlling the robotic arm 40, e.g., the handle controller 38a, which is transformed into a desired pose of the robotic arm 40 through a hand eye transform function executed by the controller 21a. The hand eye function, as well as other functions described herein, is/are embodied in software executable by the controller 21a or any other suitable controller described herein. The pose of one of the handle controllers 38a may be embodied as a coordinate position and roll-pitch-yaw (RPY) orientation relative to a coordinate reference frame, which is fixed to the surgeon console 30. The desired pose of the instrument 50 is relative to a fixed frame on the robotic arm 40. The pose of the handle controller 38a is then scaled by a scaling function executed by the controller 21a. In embodiments, the coordinate position may be scaled down and the orientation may be scaled up by the scaling function. In addition, the controller 21a may also execute a clutching function, which disengages the handle controller 38a from the robotic arm 40. In particular, the controller 21a stops transmitting movement commands from the handle controller 38a to the robotic arm 40 if certain movement limits or other thresholds are exceeded and in essence acts like a virtual clutch mechanism, e.g., limits mechanical input from effecting mechanical output.

The desired pose of the robotic arm 40 is based on the pose of the handle controller 38a and is then passed by an inverse kinematics function executed by the controller 21a. The inverse kinematics function calculates angles for the joints 44a, 44b, 44c of the robotic arm 40 that achieve the scaled and adjusted pose input by the handle controller 38a. The calculated angles are then passed to the robotic arm controller 41c, which includes a joint axis controller having a proportional-derivative (PD) controller, the friction estimator module, the gravity compensator module, and a two-sided saturation block, which is configured to limit the commanded torque of the motors of the joints 44a, 44b, 44c.

Figure 5:
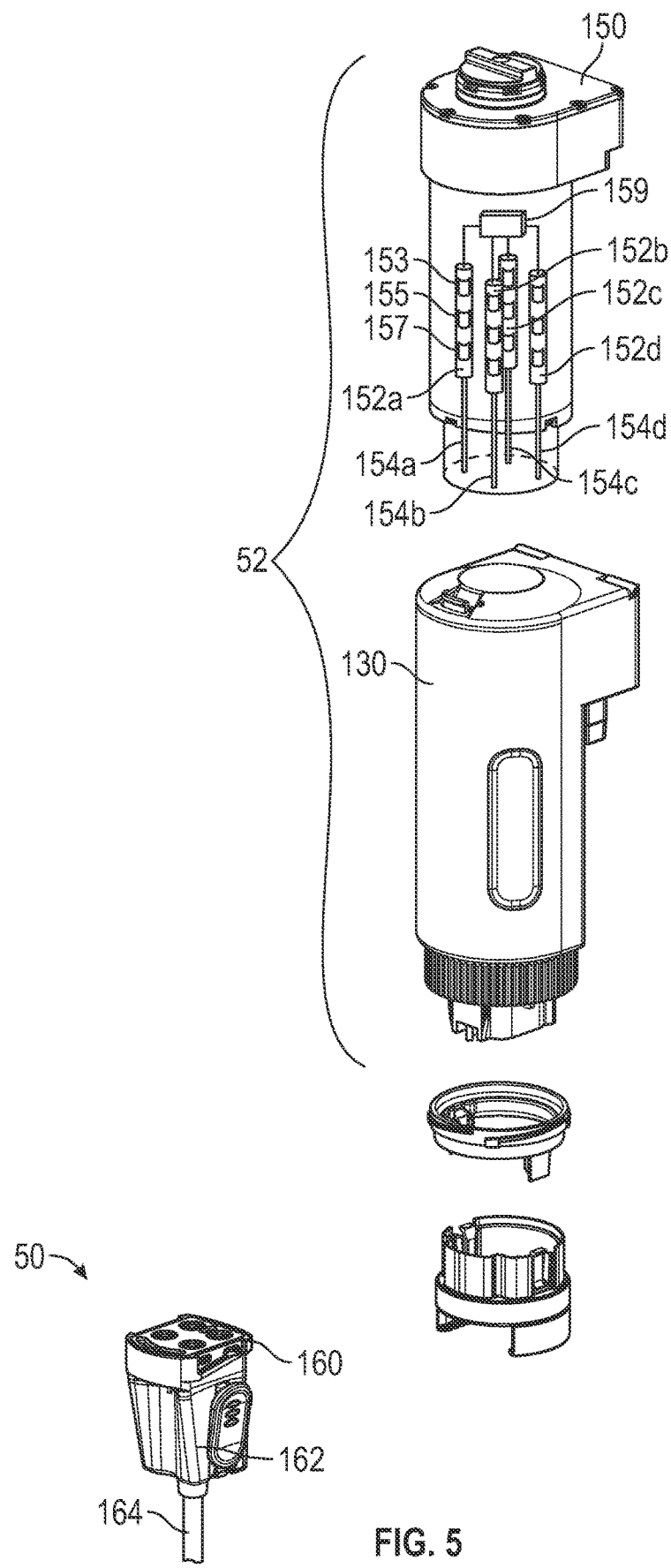
FIG. 5 is a perspective view, with parts separated, of an instrument drive unit and a surgical instrument according to an embodiment of the present disclosure.

With reference to FIG. 5, the IDU 52 is shown in more detail and is configured to transfer power and actuation forces from its motors 152a, 152b, 152c, 152d to the instrument 50 to drive movement of components of the instrument 50, such as articulation, rotation, pitch, yaw, clamping, cutting, etc. The IDU 52 may also be configured for the activation or firing of an electrosurgical energy-based instrument or the like (e.g., cable drives, pulleys, friction wheels, rack and pinion arrangements, etc.).

The IDU 52 includes a motor pack 150 and a sterile barrier housing 130. Motor pack 150 includes motors 152a, 152b, 152c, 152d for controlling various operations of the instrument 50. The instrument 50 is removably couplable to IDU 52. As the motors 152a, 152b, 152c, 152d of the motor pack 150 are actuated, rotation of the drive transfer shafts 154a, 154b, 154c, 154d of the motors 152a, 152b, 152c, 152d, respectively, is transferred to the drive assemblies of the instrument 50.

The instrument 50 is configured to transfer rotational forces/movement supplied by the IDU 52 (e.g., via the motors 152a, 152b, 152c, 152d of the motor pack 150) into longitudinal movement or translation of the cables or drive shafts to effect various functions of an end effector 120 (FIG. 7).

Each of the motors 152a, 152b, 152c, 152d includes a current sensor 153, a torque sensor 155, and an encoder sensor 157. For conciseness only operation of the motor 152a is described below. The sensors 153, 155, 157 monitor the performance of the motor 152a. The current sensor 153 is configured to measure the current draw of the motor 152a and the torque sensor 155 is configured to measure motor torque. The torque sensor 155 may be any force or strain sensor including one or more strain gauges configured to convert mechanical forces and/or strain into a sensor signal indicative of the torque output by the motor 152a. The encoder 157 may be any device that provides a sensor signal indicative of the number of rotations of the motor 152a, such as a mechanical encoder or an optical encoder. Parameters which are measured and/or determined by the encoder 157 may include speed, distance, revolutions per minute, position, and the like. The sensor signals from sensors 153, 155, 157 are transmitted to the IDU controller 41d, which then controls the motors 152a, 152b, 152c, 152d based on the sensor signals. In particular, the motors 152a, 152b, 152c, 152d are controlled by an actuator controller 159, which controls torque outputted and angular velocity of the motors 152a, 152b, 152c, 152d. In embodiments, additional position sensors may also be used, which include, but are not limited to, potentiometers coupled to movable components and configured to detect travel distances, Hall Effect sensors, accelerometers, and gyroscopes. In embodiments, a single controller can perform the functionality of the IDU controller 41*d* and the actuator controller 159.

With reference to FIG. 5, instrument 50 includes an adapter 160 having a housing 162 at a proximal end portion thereof and an elongated shaft 164 that extends distally from housing 162. Housing 162 of instrument 50 is configured to selectively couple to IDU 52 of robotic, to enable motors 152*a*, 152*b*, 152*c*, 152*d* of IDU 52 to operate the end effector 120 of the instrument 50. Housing 162 of instrument 50 supports a drive assembly that mechanically and/or electrically cooperates with motors 152*a*, 152*b*, 152*c*, 152*d* of IDU 52. Drive assembly of instrument 50 may include any suitable electrical and/or mechanical component to effectuate driving force/movement.

Figure 6:
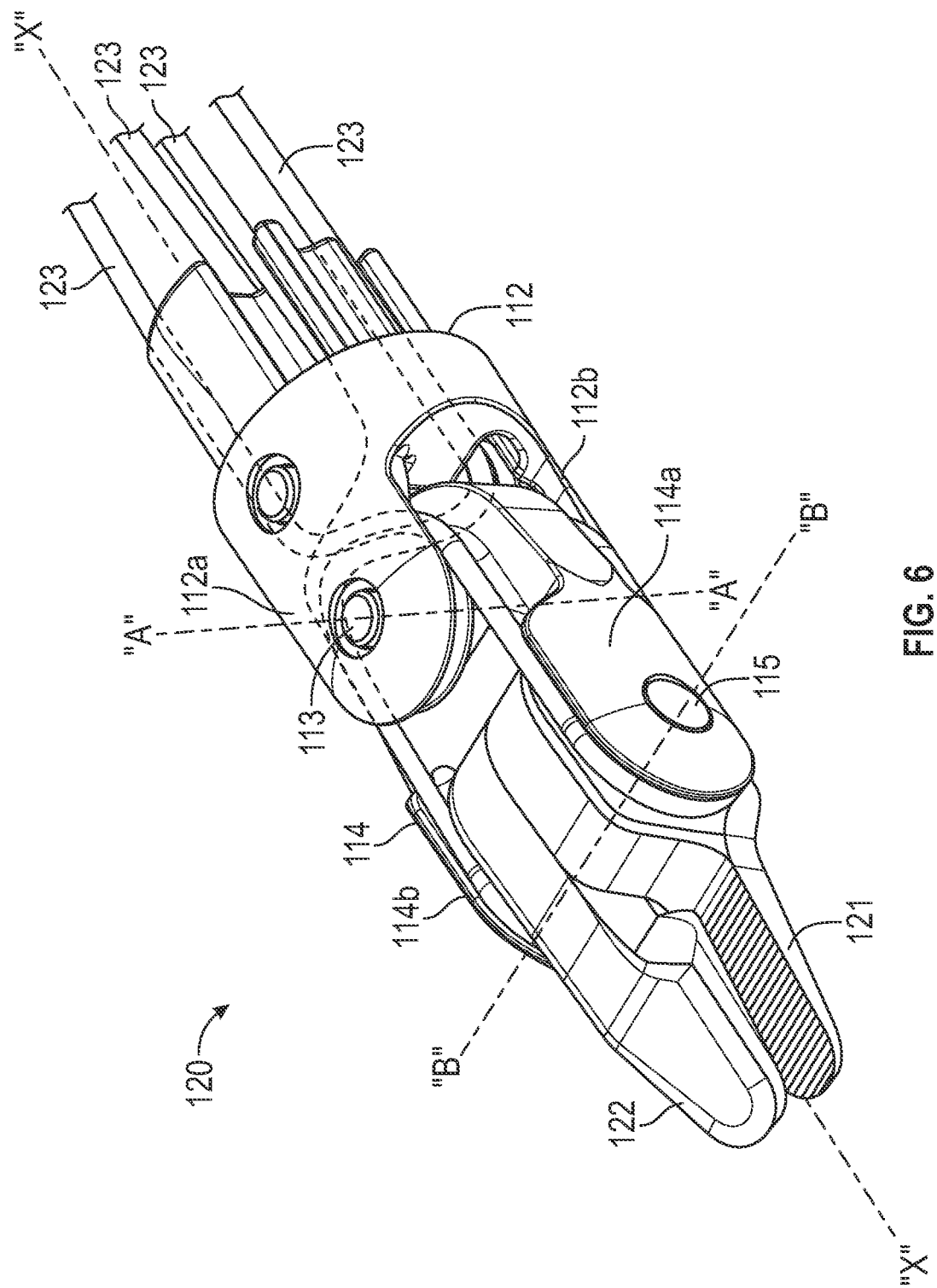
FIG. 6 is a top, perspective view of an end effector, according to an embodiment of the present disclosure, for use in the surgical robotic system of FIG. 1.

The surgical instrument also includes an end effector 120 coupled to the elongated shaft 164. The end effector 120 may include any number of degrees of freedom allowing the end effector 120 to articulate, pivot, etc., relative to the elongated shaft 164. The end effector 120 may be any suitable surgical end effector configured to treat tissue, such as a dissector, grasper, sealer, stapler, etc. As shown in FIG. 6, the end effector 120 may include a pair of opposing jaws 121 and 122 that are movable relative to each other.

In embodiments, the end effector 120 may include a proximal portion 112 having a first pin 113 and a distal portion 114. The end effector 120 may be actuated using a plurality of cables 123 routed through proximal and distal portions 112 and 114 around their respective pulleys 112*a*, 112*b*, 114*a*, 114*b*, which are integrally formed as arms of the proximal and distal portions 112 and 114. In embodiments, the end effector 120, namely, the distal portion 114 and the jaws 121 and 122, may be articulated about the axis "A-A" to control a yaw angle of the end effector with respect to a longitudinal axis "X-X" as shown in FIG. 7A. The distal portion 114 includes a second pin 115 with a pair of jaws 121 and 122 pivotably coupled to the second pin 115. The jaws 121 and 122 configured to pivot about an axis "B-B" defined by the second pin 115 allowing for controlling a pitch angle of the jaws 121 and 122 as shown in FIG. 7B as well as opening and closing the jaws 121 and 122 as shown in FIG. 7C. The yaw, pitch, and jaw angles are controlled by adjusting the tension and/or length and direction (e.g., proximal or distal) of the cables 123. Thus, the end effector 120 may have three degrees of freedom, yaw, pitch, and jaw angle between jaws 121 and 122. The three degrees of freedom, i.e., yaw, pitch, and jaw angle, are manipulated by applying varying amounts of tension to four drive cables 123 of the instrument 50. Tension is applied to the drive cables 123 by four individually addressable motors 152*a*, 152*b*, 152*c*, 152*d* in the IDU 52.

Figures 8, 9A:
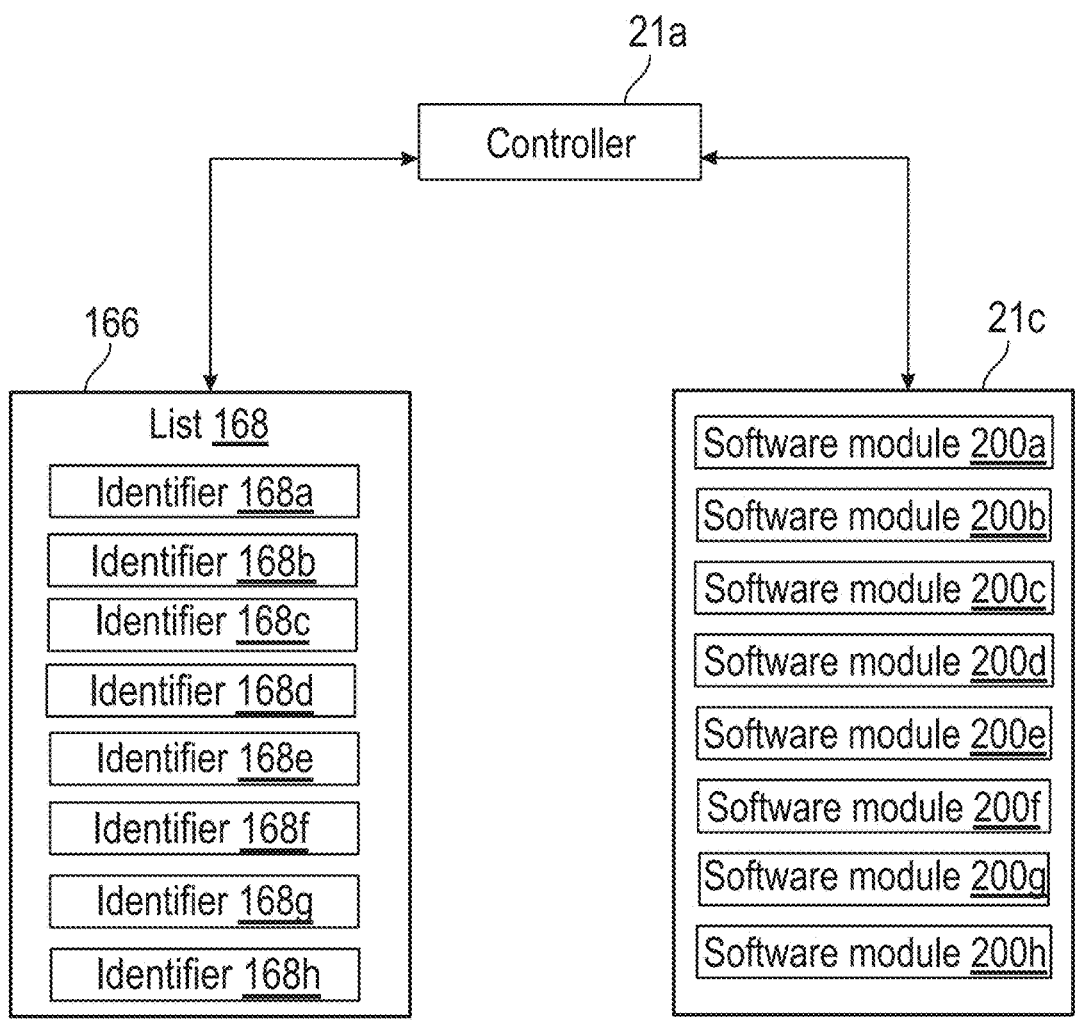

With reference to FIG. 8, the main controller 21*a* is coupled to a main memory 21*c* of the control tower 20. The main memory 21*c* may be non-volatile storage configured to store data, including software instructions for operating the robotic system 10. In addition, the main memory 21*c* also stores a library of software modules 200*a-h*, with each software module having a unique identifier. Each of the software modules 200*a-h* convert desired instrument joint angles based on input commands into IDU motor currents to control a particular instrument 50. The software modules 200*a-h* may also include specific controller algorithms that utilize the kinematic characteristics or other parameter, e.g., high order polynomials that characterize spring performance for clamping, of a particular instrument type to accurately and repeatably track actual joint angles and the desired joint angles. Thus, changes to the kinematic properties of an instrument type necessitate a corresponding change to the controller. Kinematic properties used by the software modules 200*a-h* may include static and dynamic friction, pulley diameters and spacings, link lengths, desired output forces (e.g., as clamp force and opening force), etc.

The instrument 50 also includes a memory 166. The memory 166 may be a non-volatile storage medium (e.g., EEPROM) that is configured to store any data pertaining to the instrument 50, such as a serial number, a type of instrument, operational parameters, etc. In addition, the memory 166 stores a list 168 of compatible software modules, i.e., one or more of the software modules 200*a-h* that are capable of controlling the instrument 50. In particular, the memory 166 may store unique identifiers 168*a* . . . *n* of the compatible software modules 200*a-h*.

The controller 21*a* is configured to communicate, e.g., access, read, write, with the memory 166 to read the list 168 of the compatible software modules 200*a-h*. This may be done automatically after the instrument 50 is coupled to the IDU 52, which establishes mechanical and/or electrical connections therebetween enabling actuation of the end effector 120 and the instrument 50 by the IDU 52. The controller 21*a* is configured to then search through the software modules 200*a-h* stored in the main memory 21*c* to select a compatible software module from one or more compatible software modules 200*a-h*. The selected software module 200*a-h* may then be loaded into the memory 21*c* for execution by the controller 21*a*.

As shown in FIG. 8, in an exemplary embodiment, the list 168 may include a plurality of module identifiers 168*a* . . . *n*, e.g., a first identifier 168*a* corresponding to the first software module 200*a* and a second identifier 168*b* corresponding to the software module 200*b*. The memory 21*c* stores software modules 200*a-h*, thus, the memory 21*c* includes two compatible software modules 200*a* and 200*b*, either of which may be used to control the instrument 50. The controller 21*a* may then select any of the software modules 200*a-h* listed in the list 168 using any suitable selection criteria. In particular, the controller 21*a* may select the newest of the compatible software modules 200*a-h*. In further embodiments, the controller 21*a* may select a compatible software module that has the least mechanical impact on the instrument 50 to lengthen the usable life of the instrument 50.

With reference to FIGS. 9A-C an exemplary embodiment of the list 168 is shown. The module identifiers 168*a* . . . *n* may be embodied as a single byte, which each identifier 168*a* . . . *n* being a unique integer identifier as shown in FIG. 9A. A complete list of each of the software modules 200*a-d* is shown in FIG. 9B, in which the memory 166 includes a memory map utilizing just a 1 byte address to store the list 168 having up to 8 unique software module identifiers for each of the software modules 200*a-h*. In embodiments, more than eight software modules may be stored in the memory 21*a* and the capacity of the list 168 may be expanded accordingly. The unique integer identifiers of FIGS. 9A-B may also be used to generate a compatible list value as shown in FIG. 9C. In particular, each of the unique identifier values may be added to generate a combined list value by using a bitwise or operation. The combined list value may then be used to identify one or more, i.e., a subgroup, of the compatible software modules 200*a-h*.

Figure 10:
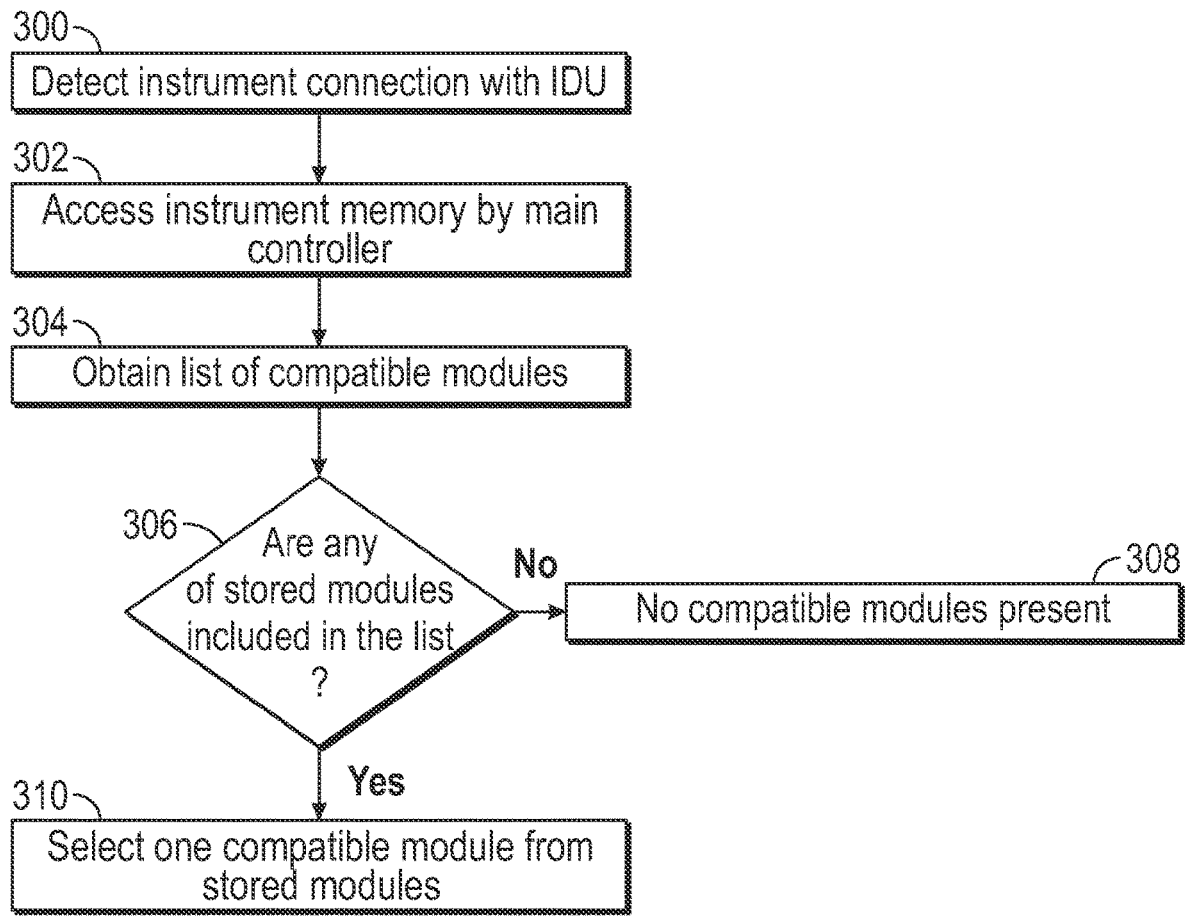
FIG. 10 is a flow chart of a method for checking compatibility in a surgical robotic system according to an embodiment of the present disclosure.

With reference to FIG. 10, a method for determining compatibility between the instrument 50 and the system 10 includes initially detecting whether the instrument 50 is connected to the IDU 52 at step 300. Once connection is established, which may be done automatically as described above, the controller 21*a* accesses the memory 166 of the instrument 50 to obtain the list 168 of compatible software modules 200a-h at step 302. The controller 21a reads the list 168 having one or more compatible software modules 200a-h at step 304. At step 306, the controller 21a searches through the stored software modules 200a-h to determine whether any of the compatible software modules 200a-h identified in the list 168 are present. If no compatible software modules 200a-h are present, the controller 21a outputs a mismatch message at step 308 stating that the instrument 50 is not compatible with the system 10 on the display 23. If one or more compatible software modules 200a-h are present, the controller 21a selects one compatible module 200 and loads it into memory 21c for execution by the controller 21a at step 310.

In embodiments, a compatible software module 200 for use by the system 10 may be stored in the memory 166 or a remote server. The software module 200 may be downloaded from the memory 166 or the remote server by the controller 21a in response to the absence of compatible software modules 200a-h being present in the system 10. Thus, at step 308, the controller 21a may also provide an option to the user to download the compatible software module 200 from an external source, e.g., memory 166 or the remote server. The controller 21a would then download the compatible software module 200. An installation progress may be provided on the display 23.

The compatibility verification method of the present disclosure allows for maintaining compatibility between new hardware versions of instruments 50 and new software versions of the system 10. As new software modules 200a-h are added to the system 10 and are loaded into the memory 21c, they may be also added to the list 168 stored in memory 166 of the new instruments 50 allowing for maintaining of compatibility between new releases of the instruments 50. The method also enables backward compatibility of new software versions with old instruments 50. In particular, new software version may store legacy, i.e., old, versions of the software modules 200a-h to support old hardware versions of the instrument 50.

The method also enables forward compatibility between old software running on the controller 21a with new hardware versions of the instrument 50. This may be enabled by listing legacy software modules 200a-h in the list 168 as being compatible with the new instrument 50. The method additionally prevents use of incompatible hardware, i.e., instruments 50, and software modules 200a-h. Thus, if the memory 21c lacks any compatible controller, the instrument 50 cannot be used by the controller 21a, preventing its use.

In embodiments, rather than storing a list of compatible modules, the memory 166 of the instrument 50 may store a hardware version of the instrument 50 and the controller 21a selects a compatible software module 200a-h based on hardware version. If the memory 166 does not include a hardware version, then the controller 21a may output a message stating that the instrument 50 is not compatible with the system 10 on the display 23 and may prevent operation of the instrument.

In further embodiments, the memory 166 of the instrument 50 may store hardware specific design parameters. Upon attachment to the IDU 52, the controller 21a reads the design parameters and directly applies those parameters in the control algorithm.

It will be understood that various modifications may be made to the embodiments disclosed herein. In embodiments, the sensors may be disposed on any suitable portion of the robotic arm. Therefore, the above description should not be construed as limiting, but merely as exemplifications of various embodiments. Those skilled in the art will envision other modifications within the scope and spirit of the claims appended thereto.

What is claimed is:

1. A surgical robotic system comprising:
    a surgical instrument including an instrument memory storing a list having at least one identifier identifying a compatible software module;
    a main memory having at least one stored software module including instructions for controlling the surgical instrument; and
    a controller configured to communicate with the instrument memory and to determine whether the at least one stored software module matches the compatible software module, wherein when a plurality of compatible software modules are identified, the controller is further configured to select one software module from among the plurality of compatible software modules based on selection criteria including at least one of (i) a newest version of the software module or (ii) a software module that minimizes mechanical impact on the surgical instrument.

2. The surgical robotic system according to claim 1, further comprising:
    a robotic arm including an instrument drive unit.

3. The surgical robotic system according to claim 2, wherein the surgical instrument is configured to couple to the instrument drive unit including at least one motor and the controller is further configured to access the list in response to detecting the surgical instrument being coupled to the instrument drive unit.

4. The surgical robotic system according to claim 3, wherein the surgical instrument includes an end effector having at least one degree of freedom and the at least one stored software module includes software instructions which, when executed by the controller, convert an input movement command into a motor current for the at least one motor to move the end effector in the at least one degree of freedom.

5. The surgical robotic system according to claim 4, the controller is further configured to load the at least one stored software module in response to the at least one stored software module matching the compatible software module.

6. The surgical robotic system according to claim 1, wherein the controller is further configured to output a mismatch message in response to the at least one stored software module not matching the compatible software module.

7. The surgical robotic system according to claim 1, wherein the at least one stored software module includes an algorithm having a parameter of the surgical instrument.

8. A surgical robotic system comprising:
    a surgical instrument including an instrument memory storing a list having a plurality of identifiers, each of which identifies a compatible software module;
    a main memory having a plurality of stored software modules, each of which includes instructions for controlling a particular type of surgical instruments; and
    a controller configured to communicate with the instrument memory and to determine whether at least one of the stored software modules matches at least one of the compatible software modules, wherein when a plurality of compatible software modules are identified, the controller is further configured to select one software module from among the plurality of compatible software modules based on selection criteria including at least one of (i) a newest version of the software module or (ii) a software module that minimizes mechanical impact on the surgical instrument.

9. The surgical robotic system according to claim 8, further comprising:
a robotic arm including an instrument drive unit.

10. The surgical robotic system according to claim 9, wherein the surgical instrument is configured to couple to the instrument drive unit including at least one motor.

11. The surgical robotic system according to claim 10, wherein the controller is further configured to access the list in response to detecting the surgical instrument being coupled to the instrument drive unit.

12. The surgical robotic system according to claim 11, wherein the surgical instrument includes an end effector having at least one degree of freedom.

13. The surgical robotic system according to claim 12, wherein a matching software module includes software instructions, which when executed by the controller convert an input movement command into a motor current for the at least one motor to move the end effector in the at least one degree of freedom.

14. The surgical robotic system according to claim 8, wherein a matching software module includes an algorithm having a parameter of the surgical instrument.

15. A method for checking compatibility in a surgical robotic system, the method comprising:
accessing an instrument memory of a surgical instrument;
obtaining a list stored in the instrument memory, the list having at least one identifier identifying a compatible software module;
determining whether at least one software module stored in a main memory matches the compatible software module, the at least one software module stored in the main memory including instructions for controlling the surgical instrument; and
selecting the at least one software module stored in the main memory based on a match with the compatible software module, wherein when a plurality of compatible software modules are identified, the controller is further configured to select one software module from among the plurality of compatible software modules based on selection criteria including at least one of (i) a newest version of the software module or (ii) a software module that minimizes mechanical impact on the surgical instrument.

16. The method according to claim 15, further comprising:
coupling the surgical instrument to an instrument drive unit including at least one motor, the instrument drive unit being disposed on a robotic arm and the surgical instrument including an end effector having at least one degree of freedom.

17. The method according to claim 16, further comprising:
accessing the list in response to detecting the surgical instrument being coupled to the instrument drive unit.

18. The method according to claim 17, further comprising:
loading the at least one software module stored in the main memory based on the match, wherein the loading includes executing software instructions stored in the at least one software module, the instructions including converting an input movement command into a motor current for the at least one motor to move the end effector in the at least one degree of freedom.

19. The method according to claim 17, further comprising:
loading the at least one software module stored in the main memory based on the match, wherein the loading includes executing software instructions stored in the at least one software module, the instructions including an algorithm having a parameter of the surgical instrument.

20. The method according to claim 17, further comprising:
indicating no compatible software module is present in response to a mismatch between the at least one software module stored in the main memory and the compatible software module.

* * * * *